(12) United States Patent
Elsaesser et al.

(10) Patent No.: US 9,845,893 B2
(45) Date of Patent: Dec. 19, 2017

(54) EXHAUST GATE

(71) Applicant: BorgWarner Esslingen Gmbh, Esslingen am Neckar (DE)

(72) Inventors: Mathias Elsaesser, Neuhausen (DE); Bernd Bareis, Taeferrot-Utzstetten (DE); Roland Dold, Herrenberg (DE); Martin Moeller, Fellbach (DE); Nicolas Stanzel, Stuttgart (DE); Axel Zuschlag, Korntal-Muenchingen (DE); Manuel Jung, Stuttgart (DE); Martin Schulz, Plochingen (DE); Jean-Francois Gaudry, Stuttgart (DE); Helmut Scheffel, Holzgerlingen (DE)

(73) Assignee: BORGWARNER ESSLINGEN GMBH, Esslingen am Neckar (DE)

( * ) Notice: Subject to any disclaimer, the term of this patent is extended or adjusted under 35 U.S.C. 154(b) by 301 days.

(21) Appl. No.: 14/623,783

(22) Filed: Feb. 17, 2015

(65) Prior Publication Data

US 2015/0240957 A1 Aug. 27, 2015

(30) Foreign Application Priority Data

Feb. 24, 2014 (DE) ........................ 10 2014 102 358

(51) Int. Cl.
*F01N 1/00* (2006.01)
*F16K 11/052* (2006.01)
*F01N 9/00* (2006.01)
*F01N 13/00* (2010.01)
*F01N 13/08* (2010.01)
(Continued)

(52) U.S. Cl.
CPC ............ *F16K 11/0525* (2013.01); *F01N 9/00* (2013.01); *F01N 13/002* (2013.01); *F01N 13/087* (2013.01); *F01N 13/16* (2013.01); *F02M 26/26* (2016.02); *F02M 26/70* (2016.02); *F02M 26/71* (2016.02); *F16K 11/052* (2013.01); *F16K 27/0227* (2013.01); *Y10T 137/87812* (2015.04)

(58) Field of Classification Search
CPC ............. F16K 11/0227; F16K 11/0525; F01N 13/087; F02M 26/26; F02M 26/70; F02M 26/71; Y10T 137/87812
See application file for complete search history.

(56) References Cited

U.S. PATENT DOCUMENTS 6,182,699 B1* 2/2001 Hawkes ................ F16K 11/052
137/861
6,698,717 B1* 3/2004 Brookshire ........... F02D 9/1045
251/305

(Continued)

FOREIGN PATENT DOCUMENTS

DE 10 2010 010 332 A1 9/2011

*Primary Examiner* — Mark Laurenzi
*Assistant Examiner* — Jason Sheppard
(74) *Attorney, Agent, or Firm* — Hackler Daghighian Martino & Novak

(57) ABSTRACT

An exhaust gate, in particular for a heavy-goods vehicle, has a housing, which has an inlet and first and second outlets, on which first and second valve seats are formed, and a valve flap, which can be pivoted between the two valve seats to close the first or second outlet. The housing is formed as a cast part, which connects the inlet and at least the first outlet integrally to each other. The valve flap has a larger cross section than the inlet and the first and second valve seats.

16 Claims, 2 Drawing Sheets

(51) Int. Cl.
*F01N 13/16* (2010.01)
*F16K 27/02* (2006.01)
*F02M 26/26* (2016.01)
*F02M 26/70* (2016.01)
*F02M 26/71* (2016.01)

(56) References Cited

U.S. PATENT DOCUMENTS

2001/0047834 A1* 12/2001 Menin ................. F16K 11/0525
                                                                137/875
2003/0192606 A1* 10/2003 Heckt .................... F01N 3/031
                                                                137/875

* cited by examiner

EXHAUST GATE

CROSS-REFERENCE TO RELATED APPLICATIONS

This application claims priority to German Patent Application No. 10 2014 102 358.7, filed Feb. 24, 2014, the entire contents of which are hereby incorporated by reference.

DESCRIPTION

Field of the Invention

The invention relates to an exhaust gate, in particular for heavy-goods vehicles, having a housing, which has an inlet and first and second outlets, on which first and second valve seats are formed, and having a valve flap, which can be pivoted between the two valve seats to close the first or second outlet.

BACKGROUND OF THE INVENTION

An exhaust gate of the prior art is known from DE 10 2010 010 332 A1. Said document discloses an exhaust gate in which the exhaust gas can be deflected by means of a flap valve between a first outlet, which is provided with an exhaust gas cooler, and a second outlet, which acts as a bypass. The exhaust gate mentioned above has a high pressure loss in the control range of the flap valve.

Exhaust gates are known in many different configurations in the prior art. The exhaust gas stream is typically conducted either in the direction of the exhaust pipe or in the direction of a thermal energy recovery system, such as a heat exchanger, or else in a bypass duct, where necessary also mixed in both directions, depending on the exhaust gas mass flow, the exhaust gas temperature and where necessary also further operating parameters.

Given this background, the invention is based on the object of creating an exhaust gate with which an exhaust gas stream can be deflected between a first and a second outlet in a particularly simple manner, a lower pressure loss being ensured in the entire control range of the exhaust gate, as well as low leakage in the valve end position.

SUMMARY OF THE INVENTION

The object achieved according to the disclosed embodiments is with an exhaust gate where the housing is formed as a cast part that connects the inlet and at least the first outlet integrally to each other, the valve flap having a larger cross section than the second valve seat. The object of the invention is achieved in this manner.

According to the invention, the configuration of the housing as a continuous cast part that connects at least the inlet and the first outlet integrally to each other ensures a simple construction and a very low pressure loss. The single-piece housing means cost-effective production. Since a flow edge is omitted and as a result a larger cross section is available, a particularly low pressure loss is produced.

In one configuration of the invention, at least one introduction slot is provided on the inlet or on one of the outlets, which slot allows introduction of the valve flap into the interior of the housing. In this manner production as a single-piece cast part is possible, with the valve flap still having a larger cross section than the second valve seat. The at least one introduction slot may be provided on a flange on the inlet or on one of the outlets.

In a further embodiment, two mutually opposite introduction slots are provided. This ensures a simple construction.

According to a further configuration of the invention, the valve flap is held on a valve shaft that is mounted pivotably at the edge between the first and second outlets in the housing. This ensures a particularly simple construction.

According to a further configuration of the invention, the valve flap is fixed in a slot on the valve shaft. This ensures simple assembly and fastening of the valve flap to the valve shaft.

According to a further configuration of the invention, a cylindrical outlet connection piece having an end face as the valve seat may be formed at the second outlet. The outlet connection piece can be fixed in a predefined installation position on the second outlet. In this manner, a particularly precise bearing of the valve flap against the valve seat of the second outlet can be ensured. Particularly low leakage in the closed position of the second outlet can thus be achieved.

According to a further configuration of the invention, the first valve seat and the second valve seat are arranged at an angle of less than 90° with respect to each other, or at an angle of less than 70°, or particularly at an angle of 50 to 60° with respect to each other. This ensures a particularly favorable construction in terms of flow, with low pressure loss. Moreover, a small setting angle is produced.

In another embodiment of the invention, the housing and the outlet connection piece consist of a stainless casting alloy, particularly of a stainless steel investment casting alloy. This ensures simple and cost-effective production and sufficient thermal resistance at high exhaust gas temperatures.

The second outlet may be formed for connection to a bypass, that is for example for bypassing a thermal energy recovery system. In this case, particularly low leakage is ensured in the normal position, i.e. in which the inlet is connected to the first outlet. Optimal operation is thus made possible for the normal case.

According to a further configuration of the invention, a drive for operating the valve flap is fastened to the outside of the housing, which drive is coupled to the valve shaft by means of a lever linkage. This allows simple and reliable operation of the valve flap.

According to a further configuration of the invention, a fail-safe spring acts on the valve shaft, by means of which spring the valve flap is pre-stressed (biased) to close the second outlet. This ensures a basic position of the valve flap in a manner that in the event of a fault, the inlet is coupled to the first outlet.

It is self-evident that the above-mentioned features of the invention and those still to be explained below can be used not only in the combination given in each case but also in other combinations or alone without departing from the scope of the present invention.

BRIEF DESCRIPTION OF THE DRAWINGS

Further features and advantages can be found in the description of an exemplary embodiment below, with reference to the drawings. In the figures.

DETAILED DESCRIPTION OF THE PREFERRED EMBODIMENTS

Figure 1:
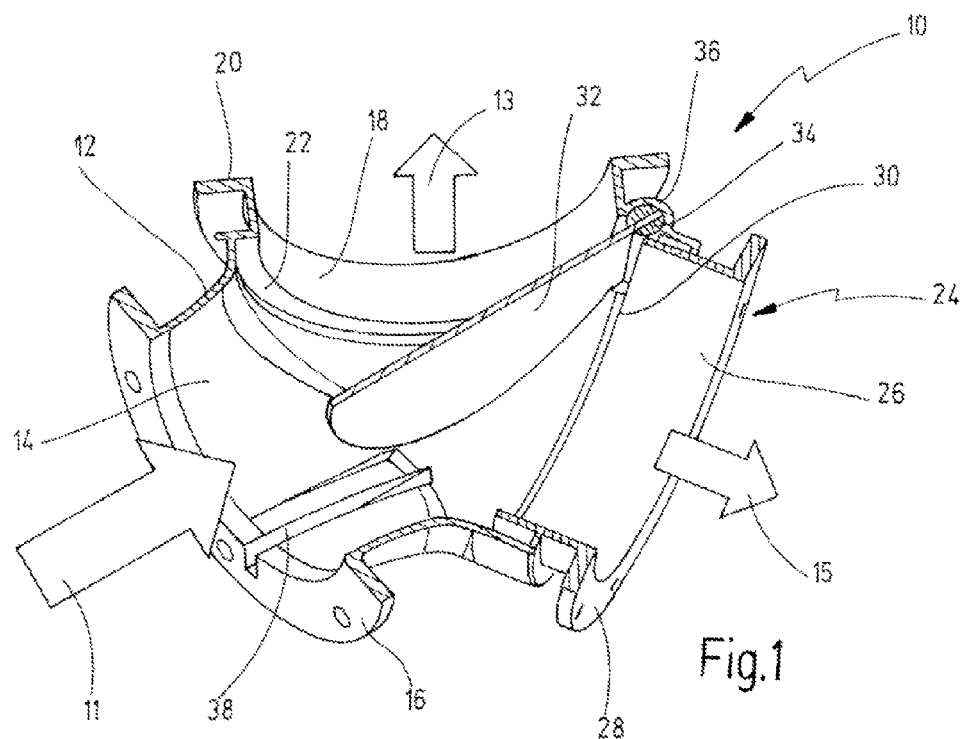
FIG. 1 shows a partially cut away, perspective illustration of an exhaust gate according to the invention.

FIG. 1 shows an exhaust gate according to the invention, which taken as a whole is referred to with the number 10.

The exhaust gate 10 is provided in particular for heavy-goods vehicles and acts to deflect exhaust gases, which flow into the inlet 14 of the exhaust gate 10 in the direction of the arrow 11, between a first outlet 18 according to arrow 13 and a second outlet 24 according to arrow 15. While the first outlet 18 is typically connected to a thermal energy recovery system, for instance a heat exchanger or evaporator, the second outlet 24 is typically connected to a bypass, which leads directly to the exhaust pipe. The exhaust gas stream is deflected entirely or partially between the first outlet 18 and the second outlet 24 typically depending on a series of operating parameters, such as the exhaust gas mass flow, the exhaust gas temperature and where necessary further operating parameters.

For the deflection, a flap valve is used, which has a valve flap 32 which is held pivotably on a valve shaft 34, which is accommodated in a shaft bearing 36 between the two outlets 18, 24 laterally on the housing 12.

The housing 12 is formed as a single-piece cast housing, which consists of a stainless steel investment casting alloy and connects a flange 16 at the inlet 14 directly to a flange 20 at the first outlet 18. A flange 28 is likewise provided at the second outlet 24, which flange however projects with an outlet connection piece 26 into the opening of the second outlet 24, so that the end face 30 of the outlet connection piece 26 acts as a valve seat 30, with which the valve flap 32 can seal.

Since the outlet connection piece 26 can be adjusted to a minimal gap width during assembly, a particularly low leakage loss can be ensured at the second outlet 24.

A valve seat 22 is likewise formed on the first flange 20 of the first outlet 18 on the side facing the valve flap 32, with which valve seat 22 the valve flap 32 can seal. The valve flap 32 has a larger cross section than the flange 16 at the inlet 14, and than the first valve seat 18 and the second valve seat 30.

Figures 2, 3:
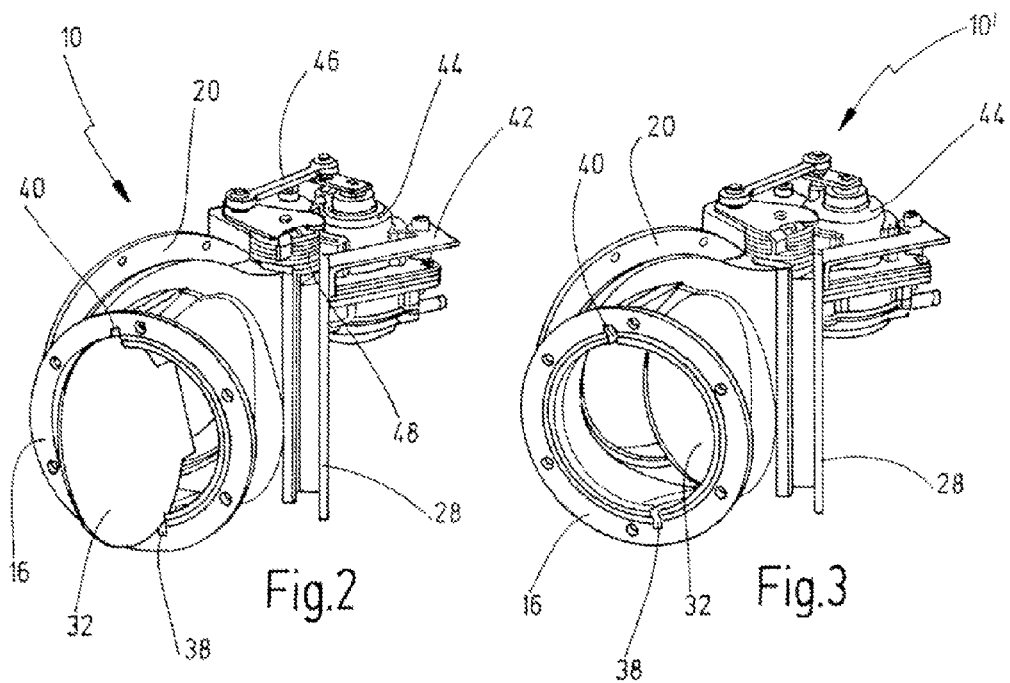
FIG. 2 shows a perspective view of the exhaust gate of FIG. 1 in a position in which the valve flap is introduced through two mutually opposite introduction slots for assembly.
FIG. 3 shows the exhaust gate of FIG. 2 with the valve flap already introduced.

Two mutually opposite introduction slots 38, 40 (cf. FIG. 2) on the flange 16 are used for introduction into the interior of the housing 12, through which slots the valve flap 32 can be introduced according to the keyhole principle, as illustrated in FIG. 2.

Figure 4:
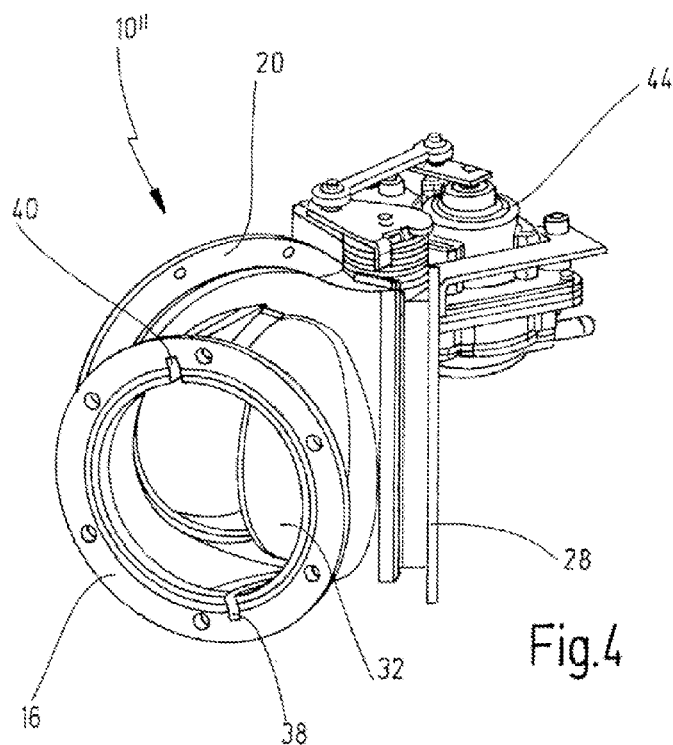
FIG. 4 shows the exhaust gate of FIG. 3 with the valve flap already aligned for introduction into the valve shaft.
Figures 5, 6:
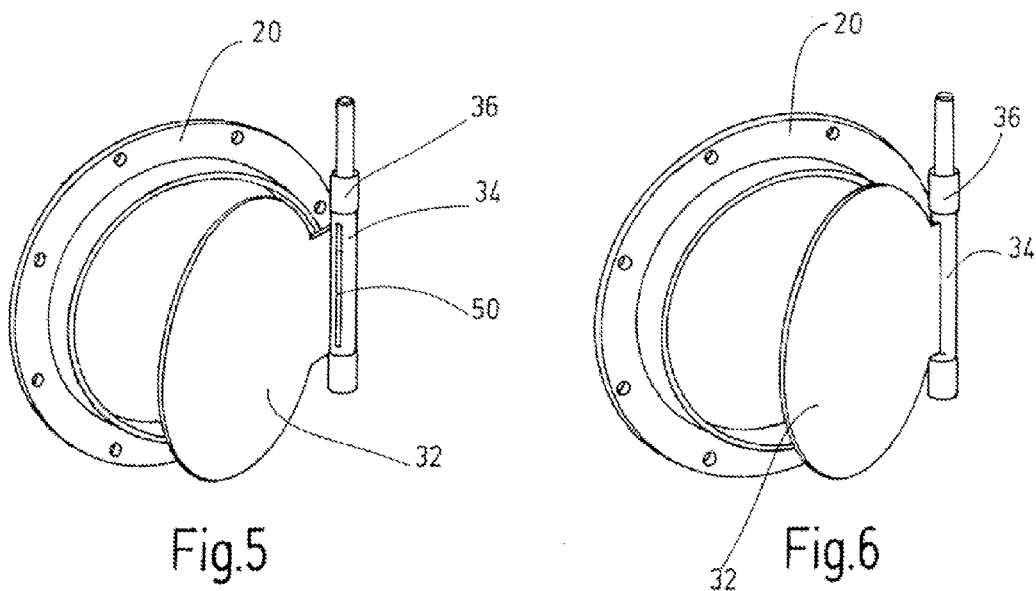
FIG. 5 shows a view of the valve shaft with the slot for introducing the valve flap.
FIG. 6 shows the valve shaft after introduction of the valve flap into the slot provided therefore.

The valve flap 32 can then, as shown in FIGS. 3 and 4, be turned and positioned correspondingly in order to be introduced into an associated slot 50 on the valve shaft 34 according to FIG. 5 and fixed thereto, as shown in FIG. 6.

In FIGS. 2 to 4, a drive 44 for pivoting the valve shaft 34 can also be seen, which drive is accommodated on a holder 42 on the outside of the housing 12 and is coupled to the upper end of the valve shaft 34 by means of a lever linkage 46. At 48, a fail-safe spring can also be seen, which is used to pivot the valve shaft 34 in the event of a fault or a failure of the drive 44 in such a manner that said flap bears against the second valve seat 30 and closes the second outlet 24.

The introduction slots 38, 40 on the flange 16, which could alternatively also be provided on the flange 20, are closed by an associated counter flange when screw-fastened to the same, so that no further sealing is necessary.

The first valve seat 22 on the first outlet 18 and the second valve seat 30 on the second outlet 24 are arranged at an angle of approximately 55° with respect to each other, as a result of which a smaller pivoting angle for the valve flap 32 is produced, which means shorter valve control times.

The approximately symmetrical arrangement of the two outlets 18, 24 in relation to the inlet 14 produces a low pressure loss.

The flat configuration of the valve flap 32 and the sealing with the likewise flat valve seats 22, 30 results in a good sealing and a low leakage loss.

Although several embodiments have been described in detail for purposes of illustration, various modifications may be made to each without departing from the scope and spirit of the invention. Accordingly, the invention is not to be limited, except as by the appended claims.

What is claimed is:

1. An exhaust gate, comprising:
a housing having an inlet integrally formed with a first and a second outlet, where the inlet is in fluidic communication with the first and second outlet;
a first valve seat formed inside the housing near the first outlet;
a second valve seat formed inside the housing near the second outlet;
wherein the inlet, first outlet, second outlet, first valve seat and second valve seat of the housing are formed as a single cast part;
a valve flap pivotably attached inside the housing and configured to seal either the first or second valve seats closing the first or second outlets from fluidic communication with the inlet;
wherein the valve flap has a minimum cross section diameter that is larger than a maximum diameter opening for each of the inlet, first valve seat and second valve seat; and
at least one introduction slot formed partially into a flange connected to the inlet, where the introduction slot is configured to partially form an assembly gap for the valve flap to pass through the inlet during assembly of the exhaust gate, where the assembly gap is larger than the minimum cross section diameter of the valve flap.

2. An exhaust gate according to claim 1, wherein the introduction slot comprises two mutually opposite introduction slots.

3. An exhaust gate according to claim 1, wherein the first valve seat and the second valve seat are arranged at an angle of less than 90° with respect to each other.

4. An exhaust gate according to claim 1, wherein the first valve seat and the second valve seat are arranged at an angle of less than 70°.

5. An exhaust gate according to claim 1, wherein the first valve seat and the second valve seat are arranged at an angle of between 50° to 60° with respect to each other.

6. An exhaust gate according to claim 1, wherein the second outlet is formed for connection to a bypass.

7. An exhaust gate according to claim 1, wherein a fail-safe spring acts on the valve shaft, by means of which spring the valve flap is pre-stressed to close the second outlet.

8. An exhaust gate according to claim 1, wherein the valve flap is held on a valve shaft, where the valve shaft is mounted pivotably at an edge in the housing between the first and second outlet.

9. An exhaust gate according to claim 8, wherein a fail-safe spring acts on the valve shaft, by means of which spring the valve flap is biased to close the second outlet.

10. An exhaust gate according to claim 1, wherein the valve flap is held on a valve shaft, which is mounted pivotably at an edge in the housing between the first and second outlets.

11. An exhaust gate according to claim 10, wherein the valve flap is fixed in a slot on the valve shaft.

12. An exhaust gate according to claim 1, wherein a cylindrical outlet connection piece having an end face as the valve seat is formed at the second outlet.

13. An exhaust gate according to claim 12, wherein the outlet connection piece can be fixed in a predefined installation position at the second outlet.

14. An exhaust gate according to claim 12, wherein the housing and the outlet connection piece consist of a stainless casting alloy.

15. An exhaust gate according to claim 12, wherein the housing and the outlet connection piece consist of a stainless steel investment casting alloy.

16. An exhaust gate, comprising:
   a housing having an inlet in fluidic communication with a first and a second outlet;
   a first valve seat formed inside the housing near the first outlet;
   a second valve seat formed inside the housing near the second outlet;
   wherein the first valve seat and the second valve seat are arranged at an angle of less than 90° with respect to each other;
   wherein the inlet, first outlet, second outlet, first valve seat and second valve seat of the housing are formed as a single cast part;
   a valve flap pivotably attached inside the housing and configured to seal either the first or second valve seats closing the first or second outlets from fluidic communication with the inlet;
   wherein the valve flap comprises a valve shaft, where the valve shaft is mounted pivotably at an edge in the housing between the first and second outlet;
   wherein the valve flap has a minimum cross section diameter that is larger than a maximum diameter opening for each of the inlet, first valve seat and second valve seat; and
   at least one introduction slot formed partially into a flange connected to the inlet, where the introduction slot is configured to partially form an assembly gap for the valve flap to pass through the inlet during assembly of the exhaust gate, where the assembly gap is larger than the minimum cross section diameter of the valve flap.

* * * * *